July 11, 1939.   L. H. DANIEL   2,165,886
ARRANGEMENT FOR SUPPRESSING HIGH FREQUENCY INTERFERENCE
Filed July 14, 1937    2 Sheets-Sheet 1

INVENTOR:-
Leslie Henry Daniel
BY
Ralph B. Stewart
ATTORNEY

July 11, 1939.   L. H. DANIEL   2,165,886
ARRANGEMENT FOR SUPPRESSING HIGH FREQUENCY INTERFERENCE
Filed July 14, 1937   2 Sheets-Sheet 2
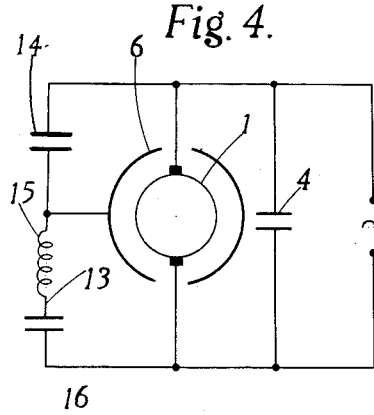
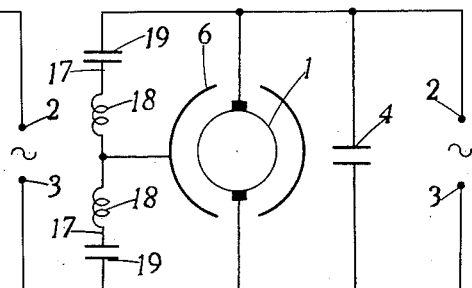
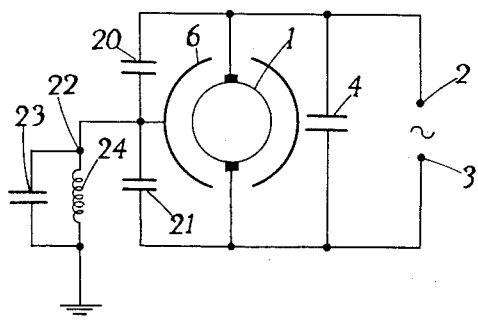
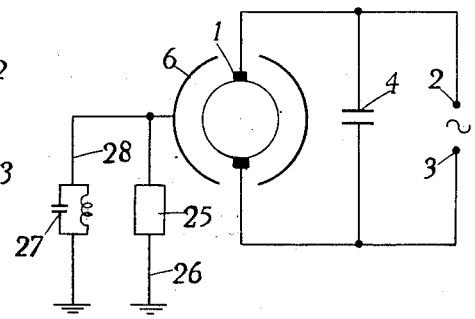
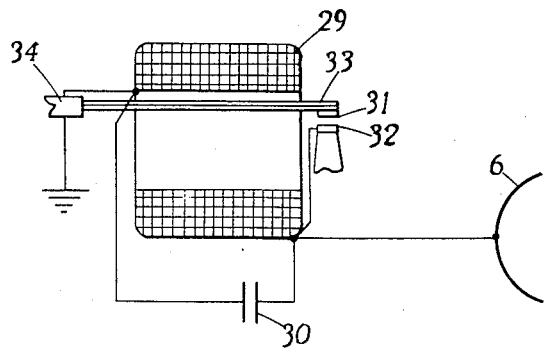
INVENTOR:-
Leslie Henry Daniel
BY
Ralph B. Stewart
ATTORNEY.

Patented July 11, 1939

2,165,886

UNITED STATES PATENT OFFICE

2,165,886

ARRANGEMENT FOR SUPPRESSING HIGH FREQUENCY INTERFERENCE

Leslie Henry Daniel, London, England, assignor to The British Electrical and Allied Industries Research Association, London, England, a body corporate of Great Britain Application July 14, 1937, Serial No. 153,685
In Great Britain July 18, 1936

13 Claims. (Cl. 171—97)

This invention relates to the suppression of high frequency interference such as results from the influence of dynamo-electric machinery on other electrical apparatus such as radio receiving sets. The invention is especially concerned with means for reducing the disturbing voltage of high frequency which occurs between the terminals of electric motors, dynamos and other electric appliances and the frame or body of such appliances, this voltage being known as an asymmetrical component of the disturbance.

In order to suppress the disturbance, in the case of an electric motor, for example, a condenser has been connected across the terminals of the electrical supply to the motor, and a small condenser or condensers between one or both terminals and the frame of the motor. In practice it has been found necessary to limit the capacity connected between any one terminal and the frame of the machine to a low value in order to avoid the danger of electric shock due to the motor, or other appliance containing the motor, being disconnected from earth or becoming temporarily disconnected. It is generally found that the largest value of the capacity in question which is considered permissible is 0.005 mfd. and, having regard to the above-mentioned risk, this does not provide adequate suppression of the asymmetrical component of the disturbance in all cases.

The object of the present invention is to improve the degree of suppression of the electrical disturbances and at the same time to avoid or lessen the risk of electric shocks being received.

According to the present invention, one or more electrical filters are connected between the frame of the machine, which may either be earthed or not earthed, and one or both of its terminals of such a character as to provide a low impedance to high frequency currents, for example some or all of the frequencies between 200 kilocycles per second and 50 megacycles per second, and a high impedance to currents of power supply frequencies. That is to say, the impedance at power frequencies must not be less than that of the largest condenser suppressor which could be connected in the same manner without danger of electric shock. The provision of a low impedance at high frequencies between the frame and terminals produces a high frequency potential drop across the internal impedance of the machine, resulting in a reduced external disturbing potential between the frame and terminals. Alternatively, in the case of a machine with an earthed frame, one or more filters of the character mentioned are connected between the frame of the machine and earth and may either be used alone or in conjunction with a filter or condenser suppressor connected between the frame and one or both of the terminals of the machine. In all cases these terminals are bridged by a condenser.

Examples of arrangements in accordance with the invention will now be described with reference to the accompanying diagrams. The dynamo-electric machine which is represented in all these diagrams may be either a dynamo or a motor, as the application of the invention is the same for both forms of machine.

Figures 4, 5 and 6 are diagrams illustrating further modifications of the invention;

Figure 7 is a diagram illustrating a form of the invention employing a leakage switch around the filter 27; and Figure 8 is a diagrammatic showing of a protective switch for short-circuiting the inductance element of the grounding filters shown in Figures 3, 6 or 7.

Figure 1:
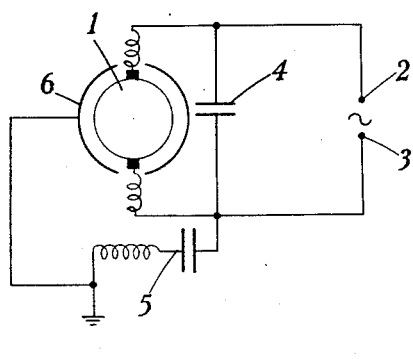
Figure 1 is a schematic diagram illustrating one form of my invention.

In the arrangement represented in Figure 1 the dynamo-electric machine 1 has its terminals 2, 3 bridged by a condenser 4. An electrical filter 5 consisting of an inductance and capacity in series is connected between the terminal 3 of the machine and the frame 6 of the machine which is earthed. The filter connected in this way constitutes a simple resonant circuit providing an impedance over a band of high frequencies, in particular the lower broadcast frequencies, less than that of the above-mentioned condenser suppressor.

Figure 2:
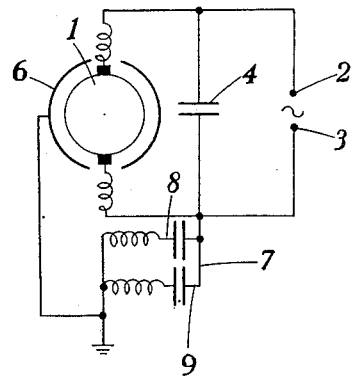
Figure 2 is a modification of the arrangement shown in Figure 1.

Figure 2 represents a modification in which an electrical filter 7 is employed which is constituted by a combination of simple series resonant circuits 8, 9 connected in parallel, each of these circuits covering a given frequency band, or any combination of band-pass filters may be used subject to the conditions already defined.

Figure 3:
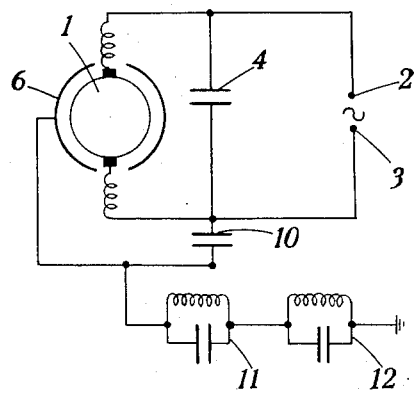
Figure 3 is a diagram illustrating a third form of the invention in which filters are inserted in the grounding connection for the frame of the machine.

In the case of a machine with an earthed frame, as already mentioned, one or more filters connected between the frame of the machine and earth may be used alone or in conjunction with a suppressor, of low impedance at radio frequencies, comprising a filter or condenser connected between the frame and one of the terminals. Figure 3 shows an arrangement in which a condenser-suppressor 10 of low impedance is connected between the terminal 3 and the frame 6 of the machine. Two electrical filters 11 and 12 are connected in series between the frame of the machine and earth, and are arranged to provide a high impedance to currents of radio frequency and a low impedance at power supply frequencies. The impedance at high frequencies of the electric supply mains to earth is in general many times smaller than the impedance of the earth lead filter with which it is series connected via the impedance between terminals and frame. As a result of this, only a small proportion of the generated disturbing voltage appears between the terminals and earth or between the supply mains and earth. Each of the filters 11 and 12 consists of an inductance with an air or magnetic core, shunted by a capacity forming a parallel resonant circuit, but there may be any combination of band-stop filters providing they have a low impedance at power frequencies.

Figures 4 and 5 show arrangements in which the frame 6 of the machine is not connected to earth. In the arrangement shown in Figure 4 a filter 13 composed of an inductance 15 and a capacity 16 in series is connected between the terminal 3 and the frame 6. If desired, a condenser 14 can be connected as indicated between the frame 6 and the terminal 2, but this condenser is not essential. For dealing with frequencies of about 200 kilocycles per second the condenser 16 may have a value of 0.005 mfd. and the inductance 15 may have a value of about 125 microhenries.

In the arrangement shown in Figure 5 filters 17 are connected each between the frame 6 and a terminal of the machine. Each of these filters 17 consists of an inductance 18 and capacity 19 in series. For suppressing a frequency of the order of 1 megacycle per second, each inductance 18 should be about 10 microhenries and each condenser 19 may be about 0.0025 mfd.

Figure 6 shows an arrangement in which a condenser 20 is connected between the frame 6 and the terminal 2, and a condenser 21 is connected between the frame and the terminal 3. The frame is connected to earth by way of a filter 22 made up of a condenser 23 and inductance 24 connected in parallel. Suitable values for the condenser 23 and inductance 24 are 0.005 mfd. and 125 microhenries respectively. The circuit comprising the earth lead filter 22 offers a high impedance to currents of radio frequency.

Cases may arise in practice where an apparatus is earthed through the ordinary earth conductor and there is a parallel lead from the earth terminal of the apparatus to an auxiliary earth via an earth leakage switch. Figure 7 represents an arrangement where the frame 6 of the machine is connected to an earth leakage switch 25 which is connected to an auxiliary earth 26. The coil of the earth leakage switch 25 would provide a high impedance to high frequencies but a filter 27 or other form of high frequency impedance would have to be inserted, in accordance with the invention, in the ordinary earth conductor lead 28.

In the case of small machines such as vacuum cleaners and hair dryers, the inductance element of the filter or both filters may conveniently be arranged inside the handle of the appliance. For example, the filter in the earth lead may consists of a multi-layer high frequency choke wound in solenoidal form on a soft iron or laminated steel core. This form of construction enables the filter to be accommodated within the handle of the appliance, whereas the construction of the equivalent air-cored choke would necessitate external mounting. It will be appreciated that it is important to keep the power frequency impedance of the earth lead filter as low as possible, since under fault conditions the filter has to be capable of maintaining the circuit during the time taken for the fuses of the circuit to blow. The use of soft iron or laminated steel for the core of the above-mentioned high frequency choke permits the use of a coil having a lower resistance and greater current-carrying capacity than would be possible with an air-cored coil or powdered core coil giving the same degree of suppression.

The above-mentioned requirement that the earth lead filter should be capable of maintaining the circuit during the time taken for the fuses to blow necessitates the use in some cases of an inductance element wound with heavy gauge wire. The disadvantage of this is that the inductance element is rendered unduly bulky and heavy. In accordance with the invention this disadvantage is overcome in that an inductance element is wound with light gauge wire, and provision is made to short-circuit the inductance upon the occurrence of fault. One arrangement for doing this is shown diagrammatically in Figure 8 in which the coil of an inductance element 29 is shown in central section. This coil may be assumed to be the inductance element of the earth lead filter shown in Figures 3, 6 or 7.

The inductance 29 is wound with light gauge wire and is bridged by a condenser 30. One end of the inductance is connected to the frame 6 of the machine and the other end is earthed. Furthermore, the ends of the inductance are connected respectively to switch contacts 31, 32. The contact 32 is stationary but the contact 31 is carried by a bi-metallic strip 33 which it will be seen extends parallel to the axis of the inductance and is located close the windings. The bi-metallic strip is suitably mounted in a member 34 which may conveniently be utilised to make the requisite earth connection.

Upon the occurrence of a fault, the resulting comparatively rapid rise of temperature of the inductance 29 soon causes the bi-metallic strip 33 to bend sufficiently to close the contacts 31, 32. The result is that the inductance 29 is short circuited before there has been time for it to become so heated by the fault current as to be damaged.

In cases where the inductance element 29 has an iron core the switch contacts 31, 32 can be operated magnetically so as to short circuit the inductance upon the occurrence of a fault.

In the appended claims, the term "filter" is to be interpreted as comprising a tuned circuit including both inductance and capacity.

I claim:

1. An arrangement for suppressing high frequency electrical interference caused by the influence of a dynamo-electric machine on other electrical apparatus, comprising in combination, a circuit path of low impedance to the interference frequency bridging the terminals of said machine, and at least one electrical filter connected between the frame of said machine and one of said terminals, said filter comprising a series resonant circuit including an inductance element and a capacity element connected in series and being tuned to have low impedance at a high frequency and a high impedance at power supply frequencies.

2. An arrangement for suppressing high frequency electrical interference caused by the influence of a dynamo-electric machine on other electrical apparatus, comprising in combination, a condenser bridging the terminals of said machine, and a plurality of electrical filters connected between the frame of said machine and said terminals, said filters comprising series resonant circuits each including an inductance element and a capacity element connected in series, said filters being tuned to present a low impedance at different high frequencies and a high impedance at power supply frequencies.

3. An arrangement for suppressing high frequency electrical interference caused by the influence of a dynamo-electric machine with an electrically-conductive frame on other electrical apparatus, comprising in combination, a condenser bridging the terminals of said machine, said frame being grounded by a connection including one or more electrical filters connected between said frame and ground, said filters comprising resonant circuits including both inductance and capacity and being of such a character as to provide a high impedance to radio frequency currents and a low impedance to currents of power supply frequencies.

4. An arrangement for suppressing high frequency electrical interference caused by the influence of a dynamo-electric machine with an electrically-conductive frame on other electrical apparatus, comprising in combination, a condenser bridging the terminals of said machine, said frame being grounded, an electrical filter comprising a resonant circuit including both inductance and capacity connected between said frame and one of said terminals, and one or more electrical filters included in the connection between said frame and ground, said filters comprising resonant circuits including both inductance and capacity and being of such a character as to provide a high impedance to high frequency currents and a low impedance to currents of power supply frequencies.

5. An arrangement for suppressing radio frequency electrical interference caused by the influence of a dynamo-electric machine on other electrical apparatus, comprising in combination, a condenser bridging the terminals of said machine, a condenser suppressor connected between the frame of said machine and one of said terminals, and one or more electrical filters connected between said frame and ground, said filters comprising resonant circuits including both inductance and capacity and being of such a character as to provide a high impedance to radio frequency currents and a low impedance to currents of power supply frequencies.

6. An arrangement for suppressing radio frequency electrical interference caused by the influence of a dynamo-electric machine on other electrical apparatus, comprising in combination, a condenser bridging the terminals of said machine, an electrical filter comprising a resonant circuit including both inductance and capacity connecting the frame of said machine with each of said terminals, and one or more electrical filters connected between said frame and ground, said filters comprising resonant circuits including both inductance and capacity and being of such a character as to provide a high impedance to radio frequency currents and a low impedance to currents of power supply frequencies.

7. An arrangement for suppressing high frequency electrical interference caused by the influence of a dynamo-electric machine on other electrical apparatus, comprising in combination, a condenser bridging the terminals of said machine, a pair of condenser suppressors connecting the frame of said machine with each of said terminals, and an electrical filter connected between said frame and ground, said filter comprising a resonant circuit including both inductance and capacity and being of such a character as to provide a high impedance to high frequency currents and a low impedance to currents of power supply frequencies.

8. An arrangement for suppressing radio frequency electrical interference caused by the influence of a dynamo-electric machine with an electrically conductive frame on other electrical apparatus, comprising in combination, a condenser bridging the terminals of said machine, said frame being grounded, an electrical filter comprising an inductance, said filter being included in the connection between said frame and ground and being of such a character as to provide a high impedance to radio frequency currents and a low impedance to currents of power supply frequencies, and switch means connected across the winding of said inductance and controlled by the strength of the current flowing therethrough, said switch means closing to short-circuit said inductance upon the occurrence of a predetermined fault current.

9. An arrangement for suppressing radio frequency electrical interference caused by the influence of a dynamo-electric machine with an electrically conductive frame on other electrical apparatus, comprising in combination, a condenser bridging the terminals of said machine, said frame being grounded, an electrical filter comprising an inductance, said filter being included in the connection between said frame and ground and being of such a character as to provide a high impedance to radio frequency currents and a low impedance to currents of power supply frequencies, and thermally-controlled switch means connected across the winding of said inductance, said switch means closing to short-circuit said inductance upon rise of temperature thereof due to the occurrence of a predetermined fault current.

10. An arrangement for suppressing high frequency electrical interference caused by the influence of a dynamo-electric machine with an electrically-conductive frame on other electrical apparatus, a circuit path connecting one terminal of said machine with said frame and having low impedance for currents of interference frequency and high impedance to currents of power frequency, and a circuit path for grounding said frame including a parallel tuned circuit having high impedance to currents of interference frequency and low impedance to currents of power frequency.

11. An arrangement for suppressing high frequency electrical interference caused by the influence of a dynamo-electric machine with an electrically-conductive frame on other electrical apparatus, a circuit path of low impedance to currents of interference frequency bridging the terminals of said machine, an electric filter comprising a series resonant circuit connected between the frame of said machine and one of said terminals, and an electric filter comprising a parallel tuned circuit connected between the frame of said machine and ground, both of said filters being tuned to said interference frequency.

12. An arrangement for suppressing radio frequency electrical interference caused by the influence of a dynamo-electric machine with an electrically conductive frame on other electrical apparatus, comprising in combination, a connection for grounding said frame, an electrical filter comprising an inductance included in the connection between said frame and ground and being of such a character as to provide a high impedance to radio frequency currents and a low impedance to currents of power supply frequencies, and switch means connected across the winding of said inductance and controlled by the strength of the current flowing therethrough to short-circuit said inductance upon the occurrence of a predetermined fault current.

13. An arrangement for suppressing radio frequency electrical interference caused by the influence of a dynamo-electric machine with an electrically conductive frame on other electrical apparatus, comprising in combination, a connection for grounding said frame, an electric filter connecting said frame to each of the terminals of said machine, each filter comprising a tuned circuit offering low impedance to currents of interference frequency and high impedance to currents of power frequency, an electrical filter comprising an inductance included in the connection between said frame and ground and being of such a character as to provide a high impedance to radio frequency currents and a low impedance to currents of power supply frequencies, and switch means connected across the winding of said inductance and controlled by the strength of the current flowing therethrough to short-circuit said inductance upon the occurrence of a predetermined fault current.

LESLIE HENRY DANIEL.